S. SEWALL, Jr.
Heddle for Looms.
No. 9,446. Reissued Nov. 2, 1880.
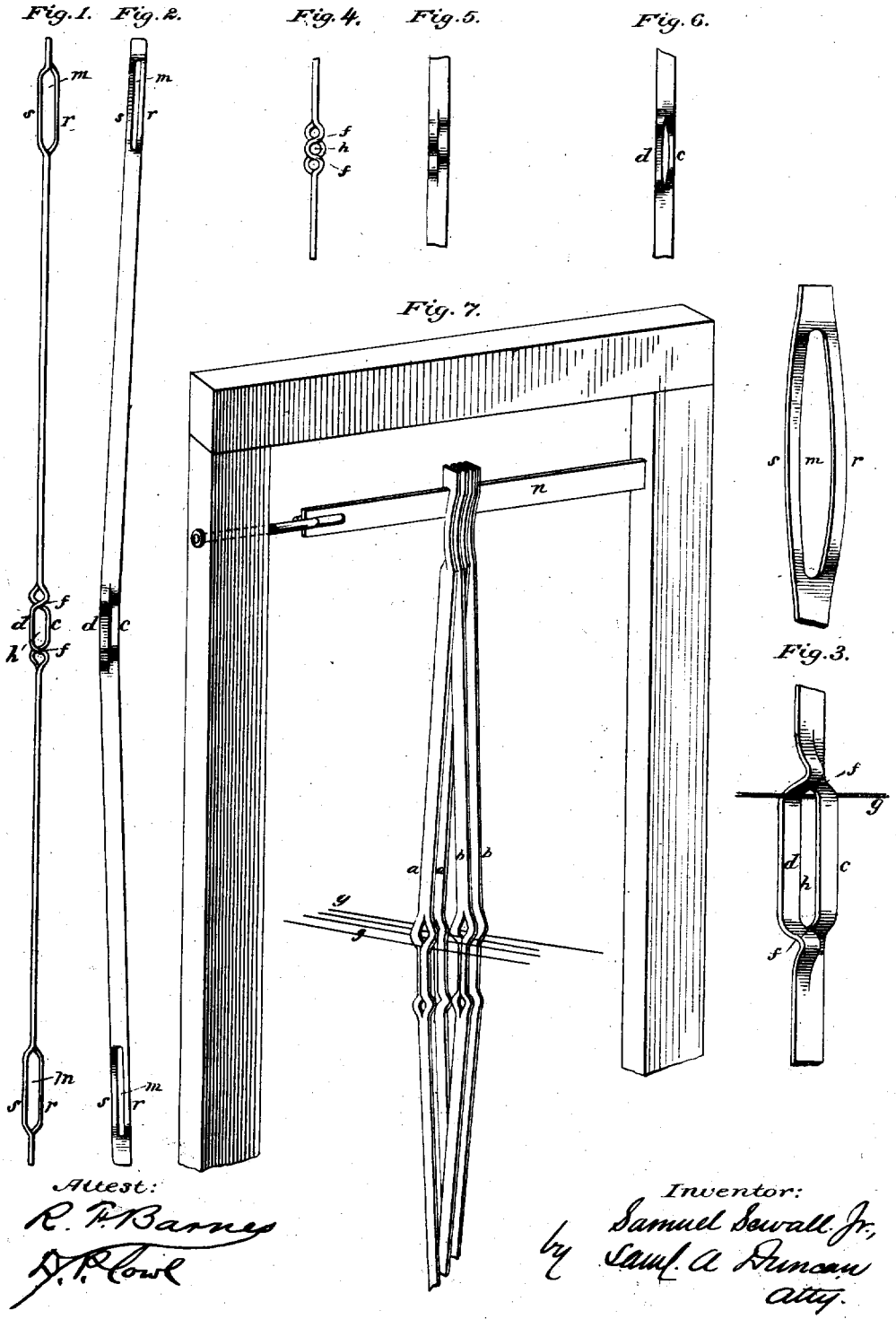
Attest:
R. T. Barnes
D. P. Lowe
Inventor:
Samuel Sewall Jr.,
by Saml. A. Duncan
Atty.

UNITED STATES PATENT OFFICE.

SAMUEL SEWALL, JR., OF TEWKSBURY, MASSACHUSETTS.

HEDDLE FOR LOOMS.

SPECIFICATION forming part of Reissued Letters Patent No. 9,440, dated November 2, 1880.

Original No. 226,886, dated April 27, 1880. Application for reissue filed June 21, 1880.

*To all whom it may concern:*

Be it known that I, SAMUEL SEWALL, Jr., of Tewksbury, in the county of Middlesex and State of Massachusetts, have invented a new and useful Improvement in Heddles for Looms, of which the following is a specification.

The object of the present invention is to provide a heddle for looms which, while occupying but small space laterally, will present a broad bearing-surface to the warp-threads, and at the same time be free from angles and corners of a nature liable to catch or pinch the threads, and thus to weaken or break them. The broader the bearing-surface the larger the number of fibers over which the strain will be distributed, and thus the less the danger of the threads being thereby broken.

The invention also relates to a peculiar construction and mode of mounting the heddle, whereby, with the same number of heddles in a given space, they will have greater play or freedom of motion among themselves; or, if required, the number of heddles to a given space can be increased without impairing their freedom of motion.

The invention is fully illustrated in the accompanying drawings.

In these drawings Figures 1 and 2 are, respectively, a front and side view of the improved heddle, and Fig. 3 is a perspective view of the middle and end portions of the same on an enlarged scale. Figs. 4 and 5, respectively, are a front and side view of the middle part of a heddle in which the eye, instead of being elongated, is circular. Fig. 6 is a modification of the eye shown in Figs. 1, 2, and 3, the modification consisting in cutting away a portion of the inner lips of the two members that form the eye. Fig. 7 is a perspective view, showing four of the heddles mounted in their frame.

This improved heddle is made from a thin strip of metal, preferably steel. The eye is formed by slitting the blank at the proper point along the middle longitudinal line, and by means of suitable dies bending the two sections of the divided blank into substantially the relative forms shown in Figs. 1, 2, 3, and 4. By an inspection of these figures it will be seen that both ends of one section of the divided blank are bent outward from the general plane of the metal strip in one direction, while the intermediate portion of such section is bent in the reverse direction sufficiently to occupy a position on the other side of the general plane of the strip, the corresponding parts of the other section of the divided blank being bent in directions opposite to those of the first part. By this construction the two sections will cross each other at two points, and their intermediate parts will form a loop which will constitute the eye of the heddle. This eye may be made circular or elongated, as may be required by the nature of the work to which the heddle is to be applied, the circular form being specially designed for weaving fabrics made from wire.

As the heddle performs its vertical reciprocations the warp-thread passing through the eye will come to a bearing at either end thereof along a line substantially in the plane of the heddle, and thus will be in contact with the inner face of the shoulders formed by the bend of the two sections and of the point where they cross; and as these sections do not meet face to face, but cross each other on opposite sides of a plane perpendicular to the warp-threads, it results that there is no corner or angle into which the thread can draw and be caught or pinched. This circumstance, as well as the extent of bearing-surface which is assured by this construction, becomes a matter of importance in fine work or where the warp-threads are of weak texture.

As the heddles can be made of very thin metal a large number can be arranged in a given space, the construction being such that the configuration of each corresponds with that of its neighbors, so that they nest together closely. ~~This will be~~ the case even when the heddles are made straight throughout, or are so constructed that the thread-eye lies in the plane of the supporting-rods; but a construction substantially like that shown in Fig. 2 is preferable. As here shown, the middle part of the heddle, being the part which contains the thread-eye, and where, therefore, the crowding is liable to occur, is thrown a little to one side of the plane in which the heddle-rods are situated, this fact being fully illustrated in Fig. 2, in which the parts forming the thread-eye are shown as lying wholly on one side of a straight line joining the end slots, which are made to receive the heddle-rods. If, when the heddles are thus formed, each alternate one is turned half around as it is slipped on the rods, the eyes will be arranged in two series, as shown at *a a* and *b b* in Fig. 7, the one a little in front of the other. As above suggested, this mode of forming and mounting the heddles presents an advantage, in that the same number of heddles can be made to occupy the same lateral space with less friction upon each other than if they were so formed and mounted that all the thread-eyes would lie in the same vertical plane; or, otherwise stated, the arrangement thus effected is a more compact one, permitting the assembling in a given lateral space, without undue friction from the overcrowding of the thread-eyes, of a larger number of heddles than would be practicable if the eyes all lay in the plane of the heddle-rods.

This arrangement of the heddles upon a single pair of heddle-rods, one at top and one at bottom, is believed to be new, although it is not claimed to be new to arrange the thread-eyes in two or more series by throwing them out of line with each other, this result having heretofore been attained with straight heddles by a duplication of rods either at top or at bottom or both. As compared with such older modes, however, the present method will be found simpler and therefore superior.

If desired, the inner lips of the heddle-eye may be cut away somewhat, as shown in Fig. 6. While this does not diminish the extent of the bearing-surface presented to the warp-thread as the thread rises and falls to form the shed, it gives greater play to the thread, and thus facilitates the passage of knots and correspondingly diminishes the chances of breakage.

This flat metal heddle is mounted in the frame in the following manner: A slot is cut in each end, the width and length of such slot being slightly greater than the thickness and width of the heddle-rod which passes through it, and the two strips of metal left at the sides of the slot are set off from the general plane of the heddle, but in opposite directions, each part being raised in the same direction as the corresponding section of the eye portion of the heddle. This construction gives the heddle greater play upon the supporting-rods than it otherwise would have, and at the same time prevents the heddle from turning around into a position to permit the thread to be caught between the inner lips of the parts which form the eye through which the thread passes.

Although the above is deemed the best mode of mounting the heddle, yet it may readily be seen that a heddle constructed as hereinbefore described, but out of a much shorter piece of metal, may be suspended from the rods by other means. So, also, the heddle may be made from a round wire, the middle or eye part and the end parts only of the same being flattened.

Referring to the drawings, *c* and *d* represent the two sections into which the middle portion of the heddle-blank is divided by the longitudinal cut. These sections, being first offset from the general plane in opposite directions, are bent sharply inward until they pass each other at the two points *f f*, thus forming shoulders at these points *f f*, against which the warp-thread *g* bears as the heddle rises and falls.

In Figs. 1, 2, 3, and 6 the eye *h* is shown as elongated. In Figs. 4 and 5 it is circular. *m* represents the slot for receiving the rod *n*, the part *r*, which forms one wall of this slot, being raised in the same direction as the part *c*, and the other part, *s*, in the opposite direction, corresponding to the part *d*.

It will readily be understood without detailed explanation that by the use of properly-constructed dies the above-described heddle can be formed from a plain blank by a single blow.

It will also be readily understood that, instead of dividing the eye part of the heddle-blank into two sections by a slit along the middle line, as shown in the drawings, it may be divided into three sections by two parallel slits, one on each side of the middle line, in which case the middle section will be offset in one direction and the two side sections in the opposite direction.

What is claimed as new is—

1. The improved heddle formed from a thin strip of metal slit at the proper point for the eye, and having the sections offset in opposite directions so as to cross each other, substantially in the manner described.

2. The heddle-eye formed from a thin and slitted metal blank, the sections of which are offset in opposite directions so as to cross each other and have their interior lips cut away, substantially as described.

3. A metallic heddle having its ends slotted and the two walls of the slot offset in opposite directions, substantially as described.

4. A metallic heddle formed from a single thin strip of metal and having its thread-eye thrown out of the plane of the eyes or slots which receive the heddle-rods, substantially as and for the purpose set forth.

5. The above-described mode of mounting a series of heddles in their frame, which consists in arranging them on a single pair of metallic rods, independent of the shafts of the frame, as described, so that the thread-eyes will come alternately in front of and behind the plane of such rods, substantially as and for the purpose set forth.

SAML. SEWALL, JR.

Witnesses:
MARY A. HOYT,
SALLA R. FOSTER.